United States Patent [19]
Laszlo et al.

[11] Patent Number: 5,359,448
[45] Date of Patent: Oct. 25, 1994

[54] INFRARED SIGNAL TRANSMITTER

[75] Inventors: Charles A. Laszlo, Vancouver; Paul L. Geyer, Burnaby, both of Canada

[73] Assignee: Assistive Listening Device Systems, Inc., British Columbia, Canada

[21] Appl. No.: 20,579

[22] Filed: Feb. 23, 1993

[51] Int. Cl.$^5$ .............................. H04B 10/04
[52] U.S. Cl. .................. 359/180; 359/142; 359/149
[58] Field of Search ............ 359/142, 146, 149-150, 359/152, 157, 172, 180-181

[56] References Cited

U.S. PATENT DOCUMENTS

| | | | |
|---|---|---|---|
| 4,648,131 | 3/1987 | Kawaguchi et al. | 359/172 |
| 5,027,433 | 6/1991 | Menadier et al. | 359/152 |

FOREIGN PATENT DOCUMENTS

| | | | |
|---|---|---|---|
| 0105540 | 5/1988 | Japan | 359/149 |
| 0126028 | 5/1989 | Japan | 359/172 |
| 0181245 | 7/1989 | Japan | 359/172 |

OTHER PUBLICATIONS

Sennheiser TI 100 Infraport instruction sheet (publ. Jan. 1991).
PE 400 T Infrared Base Station (2 sheets). (no date).
SI 460 S Infrared Transmitter (4 sheets). (no date).
Audex Soundirector Suggested Retail Price List (Jun. 1, 1992).

Primary Examiner—Richard E. Chilcot, Jr.
Assistant Examiner—Kinfe-Michael Negash
Attorney, Agent, or Firm—Klarquist, Sparkman, Campbell, Leigh & Whinston

[57] ABSTRACT

An infrared signal transmitter which has a signal generator enclosed in a housing, and a transmitter head which is removably attached thereto. The transmitter head includes a plurality of infrared transmitting elements arrayed in selected patterns to provide multidirectional transmission of infrared signals to a waiting receiver. The transmitter head and housing are provided with mating plug-in connectors permitting the transmitting head to be easily changed to provide selected transmitting arrays or patterns. The transmitter has its own power supply to be self-contained and portable.

13 Claims, 2 Drawing Sheets

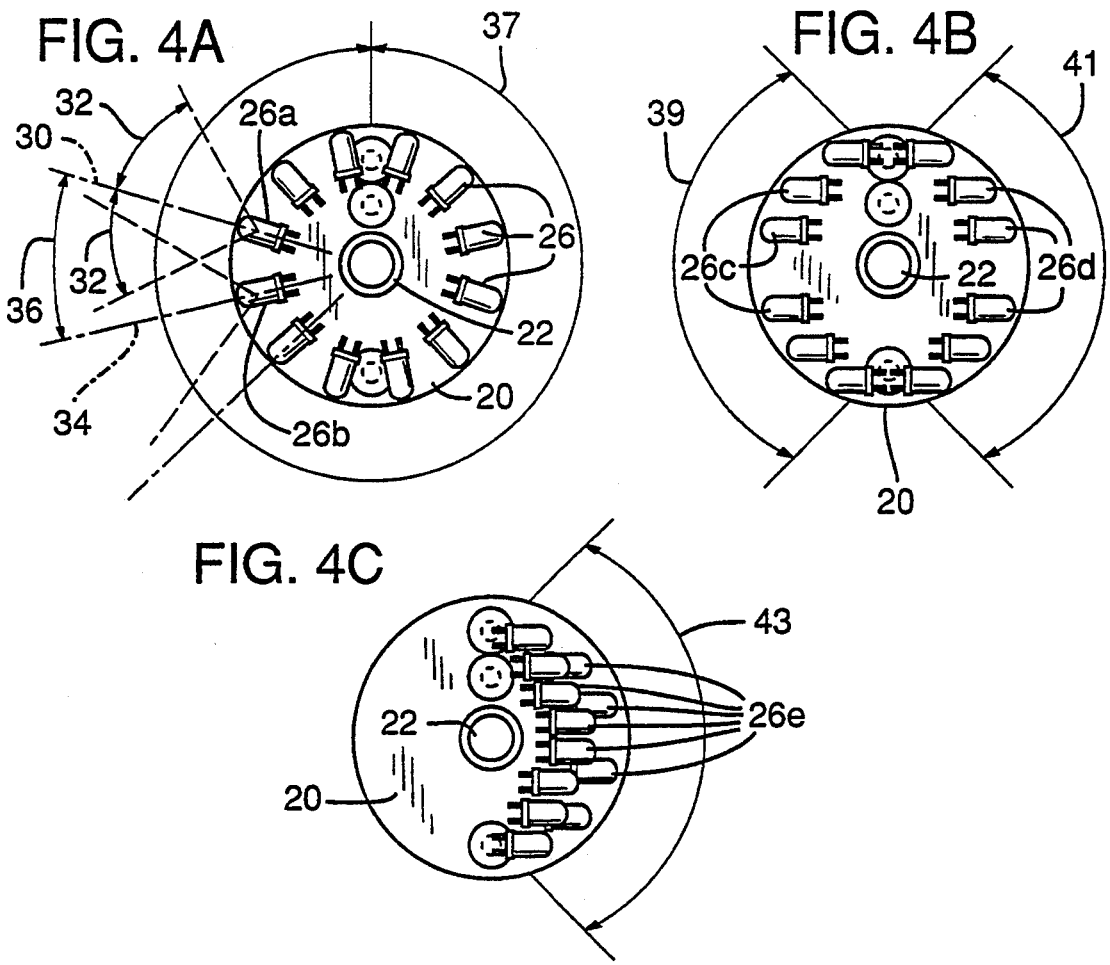
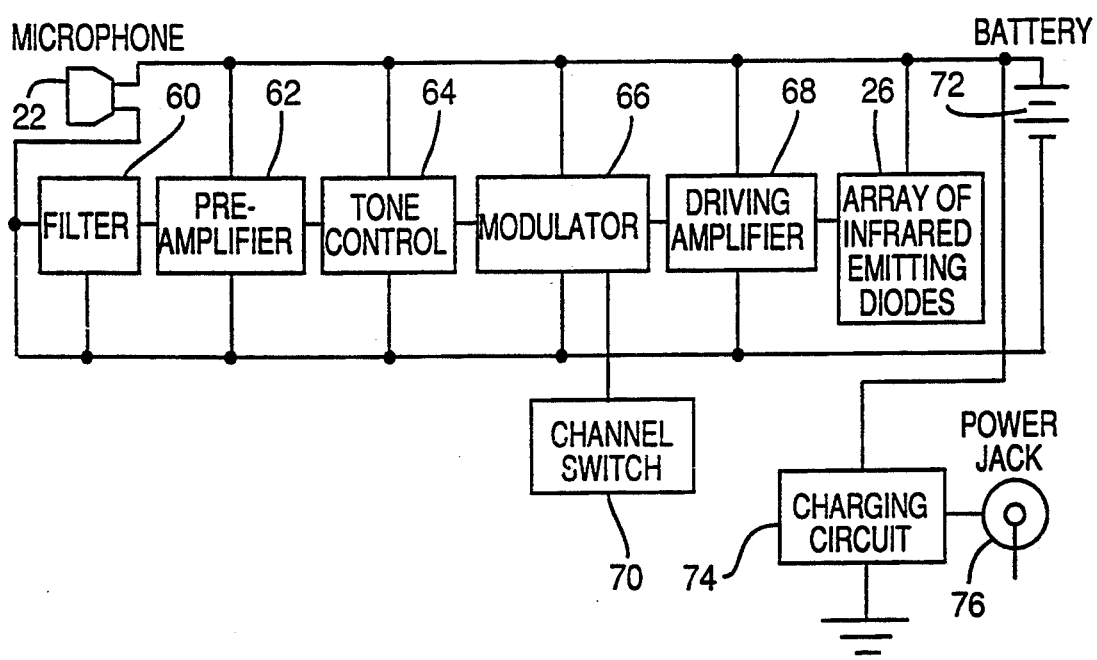

INFRARED SIGNAL TRANSMITTER

BACKGROUND AND SUMMARY OF THE INVENTION

This invention relates to an infrared signal transmitter, and more particularly to such a transmitter which is a self-contained unit capable of generating a multidirectional pattern of infrared signals.

Many people, especially as the population grows older, suffer from some form of hearing disability. For those with partial hearing loss, or hearing impairment, it is possible through sound amplification and signal processing devices to improve their ability to hear, to discriminate sounds, and to comprehend speech.

The best known devices to aid hearing are the traditional hearing aids. Such aids pick up sound waves through a microphone and convert the sound waves into an electrical signal. This electrical signal is amplified, thus increasing the signal strength, and is transmitted to the ear of the user by a small loudspeaker through an ear mold that fits in the user's ear canal. The system is powered by a small battery. There are many types of hearing aids; the four main types being (1) in the ear, (2) behind the ear; (3) in the canal; and (4) body aids.

Hearing aids may be effective for one-to-one communication and in quiet areas. However, in noisy or varied acoustical environments and open areas, such as a conference or classroom setting, the effectiveness of hearing aids decreases since sound diminishes with distance and background noises may swamp the desired sounds. To overcome such problems generated by acoustical noise, distortion and distance diminishing, systems utilizing amplification and infrared transmission have been developed.

Such infrared systems generally have employed an external microphone, an amplifier, and an array of infrared emitting diodes. The microphone placed near the sound source converts the sound waves into electrical signals which are amplified. Once amplified the electrical signal is transmitted by infrared light to a receiver worn by the user. This receiver converts the received infrared signal back into sound waves and channels them to the user either through a hearing aid or through an ear plug or earphone. With the microphone close to the desired sound source, the sound level is much higher than the background noise, enabling the user to receive the desired sounds with greater volume and clarity.

Problems with existing infrared transmitting systems for such use are their size and/or bulk, complexity of installation, and the fact that they are not self-contained in one package for ease of portability and use. Further, prior infrared transmitting systems generally have had only a flat panel infrared diode-emitting system which is directed only in one direction, limiting receivers to a specific narrow region into which infrared signals are being transmitted.

Not only are such prior devices generally only flat panel displays, which provide only unidirectional transmission of signals, but they do not provide for ease of interchangeability of transmitted signal arrays and transmitting channels.

Due to the size, bulk, and complexity of prior systems they generally are set up either permanently or specifically for a single site, for example, a church, auditorium or conference room, and are not easily adapted to a variety of uses.

An object of the present invention is to provide a novel infrared signal transmitter comprising a signal generator and a plurality of infrared transmitting elements arrayed to transmit infrared signals in a multidirectional pattern.

A further object of the invention is to provide a novel infrared signal transmitter having a signal generator, and a transmitter head, which are removably connected to each other to permit exchange of transmitter head configurations to provide a plurality of desired directional arrays of infrared signals.

A more specific object of the present invention is to provide a novel infrared signal transmitter which includes a plurality of transmitting elements arranged to transmit signals in a multidirectional pattern, wherein the elements generally are unidirectional in their transmission and they are arrayed with their respective transmitting axes disposed at angles relative to each other.

A still further object of the present invention is to provide a novel infrared signal transmitter which is a self-contained portable unit requiring minimal user set-up and no external electrical connections, which is easily and economically produced and provides high quality infrared signal transmission.

Another object of the present invention is to provide a novel infrared transmitter which includes a housing in which a signal generator is housed, a mount on which a plurality of multidirected transmitting elements are secured, and plug-in connections on the housing and mount, respectively, through which plug-in connections the mount is removably connected to the housing and the transmitting elements are operatively connected to the signal generator permitting easy connection and disconnection between the signal generator and transmitter elements for ease of interchangeability of a variety of multidirectional arrays of transmitter elements.

Yet another object of the present invention is to provide an infrared transmitter capable of amplifying and transmitting signals to an infrared signal receiver in a hearing device for the hearing impaired which transmitter includes a housing, a signal generator including a microphone and amplifier, a mount, a plurality of infrared transmitting elements operatively secured to the mount for transmitting signals received from the signal generator, an infrared transparent protective cover on the mount disposed over the transmitting elements and substantially rigid mating plug-in connector parts secured to the housing and mount, respectively, through which connector parts the mount is removably mounted on the housing and the transmitter elements are operatively connected to the signal generator to receive signals therefrom. This produces a convenient self-contained unit which has easily interchangeable transmitting elements to allow a variety of multidirectional arrays of infrared signal transmissions.

A still further object of the present invention is to provide a plurality of removable mounts for a signal transmitter, which mounts have different arrays of transmitting elements thereon, allowing the user to easily change the multidirectional signal emitting characteristics of the transmitting device.

BRIEF DESCRIPTION OF THE DRAWINGS

FIGS. 4A, 4B, 4C are enlarged top plan views taken generally along the line 4—4 in FIG. 1 of a mount and its associated transmitting elements illustrating different arrays of transmitting elements in the device; and FIG. 5 is a block diagram schematic of a signal generating circuit in the device.

DESCRIPTION OF A PREFERRED EMBODIMENT

Figure 1:
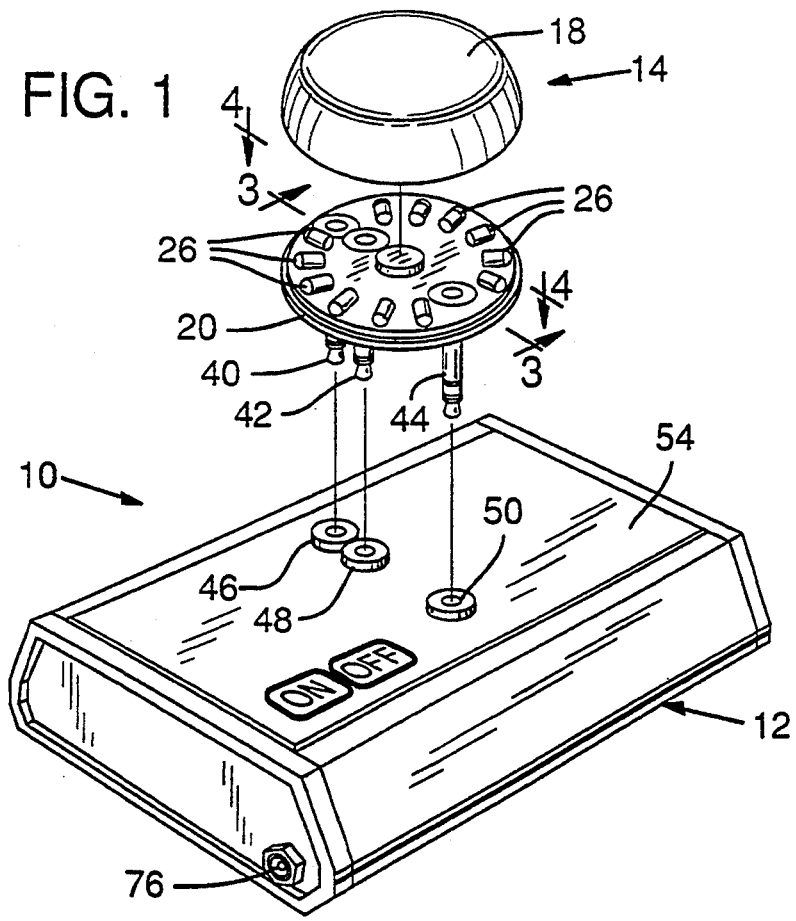
FIG. 1 is a perspective view of a signal transmitting device according to an embodiment of the present invention with a removable mount and its protective cover separated from an underlying housing.
Figure 2:
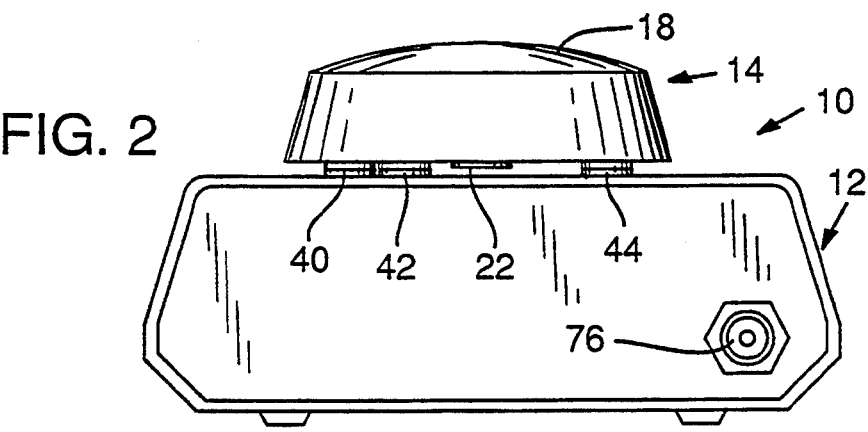
FIG. 2 is an enlarged end view of the assembled device of FIG. 1.

Referring to FIG. 1, at 10 is indicated generally a self-contained infrared signal transmitting device constructed according to a preferred embodiment of the invention. The device includes a base housing 12 and a transmitter head 14.

The transmitter head includes a protective inverted cup-shaped cover 18 which fits securely over a substantially disc-shaped mount, or plate, 20. The cover is made of an infrared transparent material such as that made by Rohm & Hass, denoted VM-100, Product No. 3-5628.

Mount 20 has a microphone 22 secured in a bore in the center thereof, with its pick-up face directed downwardly.

A plurality of infrared emitting diodes, also referred to as infrared transmitting elements, 26 are secured to the upper surface of mount 20. As is seen in FIGS. 4A, 4B, 4C, the diodes may be arranged in a variety of arrays to provide selected multidirectional patterns of infrared signals. An infrared transmitting diode which has been found to work well in such a system is made by Opto-Diode Corp., of Newberry, Calif., under Part No. OD8811.

Referring to FIG. 4A, each of the diodes in this embodiment is substantially unidirectional in its signal transmission and has a transmitting axis, such as that indicated at 30 for diode 26a. The transmitted signal from a diode expands at a first angle 32 to opposite sides of transmitting axis 30. For the diode noted, the angle of expansion 32 of the signal is approximately forty degrees (40°) on opposite sides of transmitting axis 30, for an included angle of approximately eighty degrees (80°).

The diodes in FIG. 4A are illustrated as being arrayed in a circular pattern about a central region of the mount with their transmitting axes directed radially outwardly from the central region. Referring still to FIG. 4A, the transmitting axis 34 of a diode 26b adjacent diode 26a is disposed at an angle 36 relative to axis 30 of diode 26a. Angle 36 is less than twice the first-mentioned angle 32 to provide overlap between the transmitted signals of adjacent transmitter elements as they progress outwardly from the transmitter head. In the illustrated embodiment angle 36 is approximately thirty degrees (30°).

In the configuration of diodes illustrated in FIG. 4A, the transmitter head will be capable of transmitting signals in a full three hundred sixty degree (360°) range about the transmitter head as denoted by line 37. This is referred to herein as an omnidirectional pattern of infrared signal transmission.

Referring to FIG. 4B, another multidirectional array of diodes is illustrated. In this configuration, the six diodes 26c at the left side of mount 20 are directed in substantially parallel lines to the left, whereas the six diodes 26d on the right are directed in a diametrically opposite direction. In this configuration the pattern of signals transmitted from the transmitting head would be substantially bidirectional, with the first set of diodes (26c) directing their signals to the left, and the second set of diodes (26d) directing their signals directly to the right in a diametrically opposed pattern to those on the left. The angle of signal transmissions from opposite sides of the transmitter head are denoted by lines 39, 41.

FIG. 4C illustrates a third configuration, or array, of diodes 26e in which all of diodes are directed to the right to produce what may be considered a unidirectional signal transmission. The angle of signal transmission for this array of diodes is denoted by line 43.

Although three different arrays of diodes are illustrated herein it should be recognized that other arrays are possible also to obtain desired transmission patterns.

Figure 3:
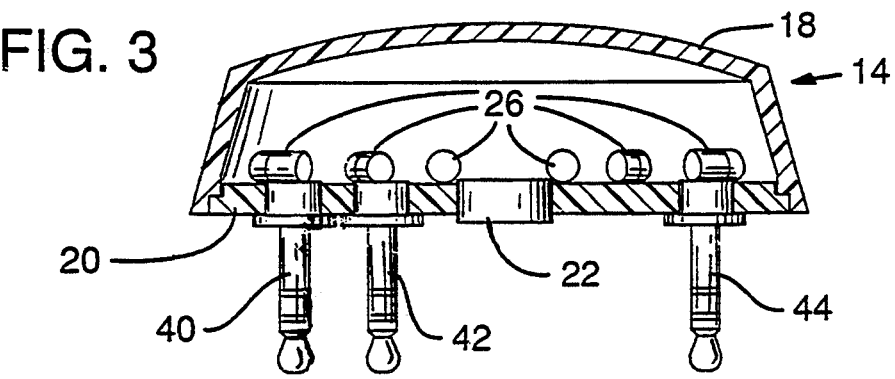
FIG. 3 is an enlarged cross-sectional view taken generally along the line 3—3 in FIG. 1.

Referring again to FIG. 3, secured to and projecting downwardly from mount 20 are three rigid plug-in connectors 40, 42, 44. These are aligned with female connector sockets 46, 48, 50, respectively, secured in top plate 54 of housing 12, adapted to receive connectors 40, 42, 44 (FIG. 1). The plug-in connectors and sockets are referred to collectively herein as mating plug-in connector parts.

Mounted within housing 12 is a signal generator circuit shown schematically in block diagram in FIG. 5. The signal generator circuit includes a filter 60, a preamplifier 62, a tone control 64, a modulator 66, a driving amplifier 68, a channel switch 70, and a battery 72. The battery may be recharged through a charging circuit 74 which may be connected to an external electrical source through power jack 76. This circuitry is typical of circuits used in transmitters to convert audio signals to infrared signal outputs.

The modulator 66 processes audio signals into a proper form for transmission. Such modulation may be, but is not limited to frequency, phase, amplitude or any form of pulse code modulation. The signal may be encoded either in analog or digital form.

The microphone 22 and diodes 26 on mount 20 are appropriately connected to plug-in connectors 40, 42, 44, such that when the transmitting head 14 is in place with connectors 40, 42, 44 inserted fully into sockets 46, 48, 50, respectively, a circuit is completed as indicated in FIG. 5, with microphone 22 and diodes 26 operatively connected to the signal generator circuit within housing 14.

Microphone 22 is positioned in an inverted orientation in the bottom of mount 20 and overlies top plate 54 of housing 12. The microphone is an omnidirectional pressure zone microphone, enabling sound wave reception from any direction.

In operation a selected transmitting head with diodes disposed as illustrated in one of the configurations illustrated in FIGS. 4A, 4B, 4C, or another selected pattern, is plugged into the top of housing 12 whereby microphone 22 and its associated diodes 26 are connected to the signal generator circuit. The mating plug-in connectors on the transmitting head (40, 42, 44) and the housing (46, 48, 50) removably secure and support the transmitting head on the housing.

The present device is designed to be portable, and thus is small and light enough to be transported easily from location to location. It is self-contained with a sound wave receiver (microphone), amplifier, and infrared signal transmitters which requires no external set-up, no complex installation, and no external attachments except that which may be needed periodically to charge the batteries.

The transmitting device thus described may be used by a single or multiple users. Typical applications are in large area rooms with numerous people in the audience where the speaker and listeners are separated by some distance. This could occur where a lecture would be presented, the present device would be placed on the speaker's rostrum and the user or users, wearing infrared receivers, would receive an amplified speech. Another application would be in a conference setting where the present device may be placed at the center of a conference table and the user, or users, wearing infrared receivers, would hear all of the attendees clearly and audibly.

To use the present device it is merely placed close enough to the sound source that the microphone picks up clean sound. It is transformed into an appropriate signal through the signal generator circuitry described, and then is transmitted from diodes 26 to a suitable infrared receiver to provide amplified sound for a hearing impaired party.

The provision of multiple transmitting heads, with differing arrays of diodes permits easy interchangeability and revision of the signal pattern. For example, should it be desired to provide an omnidirectional three hundred sixty degree (360°) pattern of signal generation, a transmitting head as illustrated in FIG. 4A would be connected to the housing and signal generator circuit. Should a bidirectional signal pattern be desired, a transmitting head having diodes in the configuration illustrated in FIG. 4B would be attached. For substantially unidirectional signal transmission a transmitting head having diodes arrayed as illustrated in FIG. 4C would be appropriate.

It is a simple matter to change transmitting heads, since it merely requires unplugging one transmitting head by releasing the plug-in connectors 40, 42, 44 from their receiving sockets 46, 48, 50 in housing 12 and inserting a second transmitting head with the desired signal array pattern.

It should be recognized that variations and modifications are possible without departing from the spirit of the invention as set out in the appended claims.

I/we claim:

1. An infrared signal transmitter comprising:
   a signal generator,
   a housing in which said signal generator is housed,
   a mount removably secured to said housing,
   a plurality of infrared transmitting elements secured on said mount and operatively connected to said signal generator for transmitting signals received from said signal generator, said transmitting elements being arranged to transmit signals in a multi-directional pattern, and
   mating plug-in connector parts on said housing and mount respectively, through which connector parts said mount is removably secured to said housing and said transmitting elements are operatively connected to said signal generator.

2. The transmitter of claim 1, which further comprises a second mount, said second mount having plug-in connector parts for connecting to said housing and signal generator and a plurality of infrared transmitting elements thereon arrayed to transmit signals in a pattern different from the pattern of said transmitting elements on the first-mentioned mount, and said first-mentioned and second mounts may be exchanged on said housing to provide selected signal transmitting patterns.

3. The transmitter of claim 1, wherein said signal generator comprises a microphone.

4. A self-contained infrared signal transmitter comprising:
   a housing having a signal generator therein,
   a first transmitting head having a plurality of infrared transmitting elements secured thereon arrayed in a first multi-directional signal transmitting pattern,
   a second transmitting head having a plurality of infrared transmitting elements secured thereon arrayed to transmit signals in a pattern different from the signal transmitting pattern of said first transmitting head, and
   mating plug-in connector parts on said housing and said first and second transmitting heads through which each of said transmitting heads may be removably secured to said housing and said transmitting elements are operatively connected to said signal generator for transmitting signals received from said signal generator, permitting exchange of said transmitting heads to provide selected signal transmitting patterns.

5. The transmitter of claim 4, wherein said transmitting elements comprise infrared emitting diodes.

6. The transmitter of claim 4, which further comprises an infrared transparent protective cover on said first transmitting head disposed over said transmitting elements.

7. The transmitter of claim 4 wherein each of said transmitting elements on said first transmitting head is operable to transmit generally unidirectionally along a transmitting axis, and transmitting elements are arrayed with their respective transmitting axes disposed at angles relative to the transmitting axes of other transmitting elements in said transmitter.

8. The transmitter of claim 7, wherein the transmitted signal from a transmitting element expands at a first angle from said transmitting axis as it progresses away from said element and adjacent transmitting elements are positioned with their transmitting axes disposed at an angle to each other which is less than twice said first angle to provide overlap between transmitted signals and adjacent transmitter elements.

9. The transmitter of claim 7, wherein said transmitting elements are arrayed about a central region and disposed with their transmitting axes projecting radially from said central region.

10. The transmitter of claim 9, wherein said transmitting elements are arrayed in a substantially circular pattern to produce a signal transmission pattern encompassing a full circle.

11. The transmitter of claim 4, wherein each transmitting element is operable to transmit generally unidirectionally along a transmitting axis and a pair of said transmitting elements are positioned with their transmitting axes disposed in substantially opposite directions.

12. The transmitter of claim 4, wherein an amplifier is mounted in said housing, a microphone is secured to a transmitting head, and said plug-in connector parts operatively connect said microphone to said amplifier.

13. The transmitter of claim 4, which further includes a battery in said housing operable to power said signal generator making said transmitter self-contained and portable.

* * * * *